(12) United States Patent
Kokkonen (10) Patent No.: US 10,819,118 B2
(45) Date of Patent: Oct. 27, 2020

(54) METHOD FOR OPERATING INVERTER AND INVERTER ARRANGEMENT

(71) Applicant: ABB Schweiz AG, Baden (CH)

(72) Inventor: Jesse Kokkonen, Nurmijärvi (FI)

(73) Assignee: MARICI Holdings The Netherlands B.V., Rotterdam (NL)

( * ) Notice: Subject to any disclaimer, the term of this patent is extended or adjusted under 35 U.S.C. 154(b) by 186 days.

(21) Appl. No.: 16/001,395

(22) Filed: Jun. 6, 2018

(65) Prior Publication Data

US 2018/0358813 A1     Dec. 13, 2018

(30) Foreign Application Priority Data

Jun. 7, 2017   (EP) .................... 17174742

(51) Int. Cl.
*H02J 3/38*     (2006.01)
*H02M 1/32*     (2007.01)
*H02M 7/48*     (2007.01)

(52) U.S. Cl.
CPC .............. *H02J 3/385* (2013.01); *H02M 1/32* (2013.01); *H02M 7/48* (2013.01)

(58) Field of Classification Search
USPC .......................................................... 307/84
See application file for complete search history.

(56) References Cited

U.S. PATENT DOCUMENTS

| 7,158,395 | B2 * | 1/2007 | Deng | G05F 1/67 363/95 |
| 2010/0265747 | A1 * | 10/2010 | Egiziano | G05F 1/67 363/132 |
| 2013/0077372 | A1 * | 3/2013 | Wagoner | H02J 3/383 363/131 |
| 2014/0211530 | A1 | 7/2014 | Chen et al. | |

OTHER PUBLICATIONS

Australian Patent Office, Examination Report issued in corresponding Application No. 2018203867, dated Dec. 7, 2018, 6 pp.
European Patent Office, Extended Search Report issued in corresponding Application No. 17174742.1, 5 pp.
European Patent Office, Communication pursuant to Article 94(3) EPC issued in corresponding European application No. 171747421, dated Sep. 16, 2020, 7 pp.

* cited by examiner

*Primary Examiner* — Rexford N Barnie
*Assistant Examiner* — Xuan Ly
(74) *Attorney, Agent, or Firm* — Taft Stettinius & Hollister LLP; J. Bruce Schelkopf (57) ABSTRACT

A method for operating an inverter and an inverter arrangement including an inverter, and a controller configured to control the inverter to convert DC power into AC power with a DC input voltage control by applying a maximum power point tracking, MPPT, during the converting, in response to the DC power supplied to the inverter exceeding a predetermined power threshold value, control a DC input voltage of the inverter to a lowered value lower than a voltage value corresponding to the maximum power point, and after controlling the DC input voltage of the inverter to the lowered value, control the inverter to convert DC power into AC power with the DC input voltage control by applying the lowered DC input voltage value.

20 Claims, 3 Drawing Sheets

METHOD FOR OPERATING INVERTER AND INVERTER ARRANGEMENT

FIELD OF THE INVENTION

The invention relates to a method for operating an inverter, and to an inverter arrangement.

BACKGROUND OF THE INVENTION

An inverter is an electrical device enabling conversion of DC (direct current) power from a DC power source to AC (alternating current) power. Herein 'inverter' generally refers to an electronic device or circuitry that is able to convert direct current to alternating current. An example of the inverter is a semiconductor bridge implemented by means of controllable semiconductor switches, such as IGBTs (Insulated-gate Bipolar Transistor) or FETs (Field-Effect Transistor), which are controlled according to a modulation or control scheme used.

One example of an electric system comprising an inverter is a photovoltaic system, such as a photovoltaic power plant or generator, in which one or more photovoltaic panels supply DC power to the inverter which converts the DC power to AC power, which may further be supplied to various AC loads via an AC network, for example. Large photovoltaic power plants may comprise a plurality of parallel inverters each receiving DC power from an array of photovoltaic panels. The inverter used may be a single-stage inverter or a multi-stage inverter. A single-stage inverter comprises only a single power electronic stage between the input and the output of the inverter taking care of not only the DC to AC conversion but also the possible MPPT and/or boosting functionality. An example of a multi-stage inverter is a two-stage inverter comprising a DC to DC stage and a separate DC to AC stage, wherein the DC to AC stage may perform the DC to AC conversion and the DC to DC stage may perform the possible MPPT and/or boosting functionality.

In such photovoltaic power generation systems, an operating point of the PV panels is preferably driven to the best possible operating point, i.e. to a point in which a maximum amount of power can be extracted from the PV panels. This kind of technique is generally called maximum power point tracking (MPPT). As an example, a common MPPT method is the so-called Perturb & Observe (P&O) method and its variations. In this method, the MPPT voltage reference of the system is constantly changed, and the resulting change in the generated power is determined. On the basis of the change of power and the change of the reference value, it can then be determined whether the reference value should be decreased or increased in order to increase the amount of power extracted. The MPPT functionality can be implemented by means of the inverter with which the DC input voltage thereof and consequently the impedance seen by the photovoltaic panel(s) can be varied and hence the operating point can be moved towards the best possible operating point, for example.

In some photovoltaic power generation systems it may be preferable to dimension the PV peak power available from the PV panel(s) of the system to be higher than a nominal or maximum power of other system components such as the inverter. For example, the peak power from the PV panel(s) may be available only for a relatively short time during the midday if the sun is shining from a clear sky. As an example, the oversizing of PV peak power available from the PV panel(s) of the system relative to the nominal or maximum power of the inverter may be about 1.2 to 1.6. Therefore, during most clear days the inverter may need to limit the power supplied from the PV panel(s) of the system in order to protect itself from overheating. During such power clipping, the maximum power point tracker of the inverter will have to abandon the optimal power point of the UI-curve of the PV panel(s). In this situation the maximum power point tracker of the inverter will raise the DC input voltage of the inverter to a higher voltage level than the voltage value corresponding to the maximum power point in an effort to load the PV panel(s) less by controlling the DC voltage value closer to an open circuit voltage of the PV panel(s).

A problem related to the above solution is that the power throughput capability of the photovoltaic power generation system may not be ideal.

BRIEF DESCRIPTION OF THE INVENTION

The object of the invention is thus to provide a method and an apparatus for implementing the method so as to solve or at least alleviate the above problem or at least to provide an alternative solution. The object of the invention is achieved with a method, a computer program product, an inverter arrangement and an electric system that are characterized by what is stated in the independent claims. Preferred embodiments of the invention are described in the dependent claims.

The invention is based on realizing that raising of the DC input voltage to a higher voltage level than the voltage value corresponding to the maximum power point a higher operating voltage introduces a problem because the higher the DC input voltage of the inverter is, the less the inverter can be loaded. The invention is further based on controlling, in response to detecting that the DC power supplied from the DC power source to the DC input of the inverter exceeds a predetermined power threshold value, the DC input voltage of the inverter to a lowered value, which is lower than a voltage value corresponding to the maximum power point of the MPPT.

An advantage of the solution of the invention is that the operation of the inverter can be better optimized in situations where the inverter needs to limit the DC power supplied from the DC power source by deviating from the maximum power point of the MPPT in order to protect itself from overheating.

BRIEF DESCRIPTION OF THE FIGURES

In the following, the invention will be described in more detail in connection with preferred embodiments and with reference to the accompanying drawings, in which.

DETAILED DESCRIPTION OF THE INVENTION

The application of the invention is not limited to any specific system, but it can be used in connection with various electric systems. Moreover, the use of the invention is not limited to systems employing any specific fundamental frequency or any specific voltage level, for example.

Figure 1:
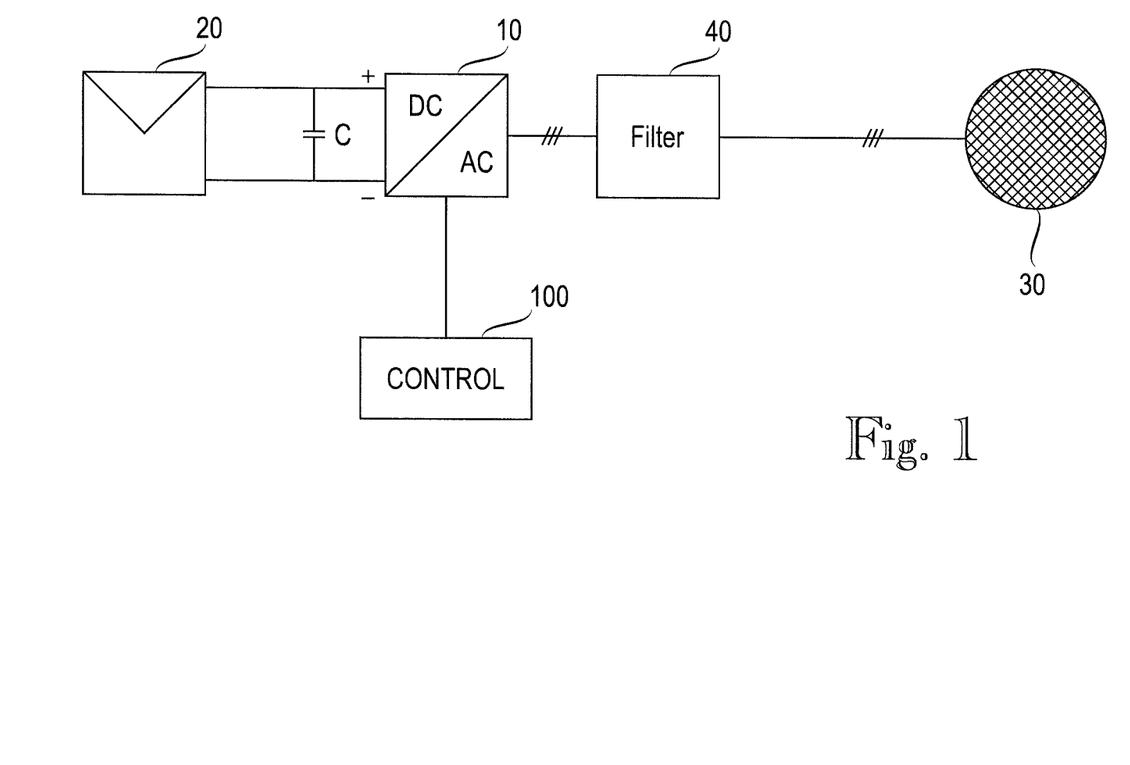
FIG. 1 illustrates an example of an electric system according to an embodiment.

FIG. 1 illustrates a simplified example of an electric system. The figure shows only components necessary for understanding the invention. The exemplary system of FIG. 1 comprises an inverter 10. The inverter 10 may be a single-stage inverter or a multi-stage inverter comprising two or more converter stages. Herein the term single-stage inverter is considered to include also operatively single-stage inverters regardless of how many physical stages they may comprise. As an example, a multi-stage inverter may be operatively a single-stage inverter if only its DC to AC stage is operative (active) and any preceding DC to DC stage(s) is (are) bypassed (non-active). A DC input of the inverter 10 may be connected to a DC power source 20, such as a photovoltaic DC power source, as illustrated. An example of a photovoltaic DC power source 20 is a photovoltaic (PV) panel or an array of two or more photovoltaic panels. Other type(s) of DC power source(s) could also be utilized such as a wind power DC power source or a fuel cell DC power source, There may be one or more switches (not shown) between the inverter 10 and the DC power source 20 enabling the connection and disconnection of the inverter to/from the DC power source. The exemplary system of FIG. 1 further shows a capacitance C connected between the (positive + and negative −) poles of the DC input of the inverter 10. Further, an AC output of the inverter 10 may be connected to an AC network 30, such as a public electrical grid or other kind of AC network, in order to supply power from the DC power source 20 to the AC network 30, when the electric system is in normal operation. There may be one or more switches (not shown) between the electric system and the AC network 30, enabling the connection and disconnection of the electric system to/from the AC network 30. The AC connection between the inverter 10 and the AC network 30 may be a one-phase AC connection or a three-phase AC connection as illustrated, for example. The exemplary system of FIG. 1 further shows an AC output filter 40 connected to the AC output of the inverter 10. The AC output filter 40 may be an LCL-filter, for example. There could also be one or more transformers or converters (not shown in the figure) connected between the AC output of the inverter 10 and the AC network 30, for example.

The exemplary system of FIG. 1 further comprises a control arrangement for the inverter 10, which exemplary control arrangement comprises a control unit 100. While this exemplary control unit has been illustrated as a separate unit, it could be included within the inverter 10. The control unit 100 may control the normal operation of the inverter 10 according to a modulation scheme used, for example. Moreover, the functionality according to the various embodiments described herein may be implemented at least partly by means of the control unit 100 for the inverter 10.

According to an embodiment, the inverter 10 may be operated such that. DC power supplied from the DC power source 20 to the DC input of the inverter 10 is converted by the inverter into AC power supplied from the AC output of the inverter to an AC network 30 with a DC input voltage control by applying the maximum power point tracking, MPPT. Thus, a DC input voltage of the inverter 10, and consequently an output voltage of the DC power source 20, is controlled according to the MPPT technique applied. The MPPT technique used may be selected from known MPPT techniques, such as the Hill Climbing techniques, for example. An example of the Hill Climbing technique is the Perturb & Observe method. During the converting by applying the MPPT, in response to detecting that the DC power supplied from the DC power source 20 to the DC input of the inverter 10 exceeds a predetermined power threshold value, the DC input voltage of the inverter is controlled to a lowered value, which is lower than a voltage value corresponding to a maximum power point of the MPPT. According to an embodiment, the DC input voltage of the single-stage inverter is controlled to the lowered value such that the DC power supplied from the DC power source to the DC input of the inverter at the most equals the predetermined power threshold value. After controlling the DC input voltage of the inverter to the lowered value, DC power supplied from the DC power source 20 to the DC input of the inverter 10 is converted by the inverter into AC power supplied from the AC output of the inverter to the AC network 30 with the DC input voltage control by applying the lowered DC input voltage value. According to an embodiment, the predetermined power threshold value may equal to a maximum or nominal power of the inverter 10, for instance. According to an embodiment, the predetermined power threshold value is a function of the DC input voltage of the single-stage inverter. The predetermined power threshold value may be dependent on the temperature of the inverter 10 and/or on the temperature of one or more components of the inverter 10 and/or on the ambient temperature of the inverter 10, for example. Accordingly, the predetermined power threshold value may be adaptable to the temperature according to a predetermined formula or factor, for instance.

According to an embodiment, during the converting by applying the lowered DC input voltage value, in response to detecting that the DC power supplied from the DC power source 20 to the DC input of the inverter 10 is lower than the predetermined power threshold value, DC power supplied from the DC power source 20 to the DC input of the inverter 10 is started to convert by the inverter 10 into AC power supplied from the AC output of the inverter to the AC network 30 with the DC input voltage control by applying the MPPT. Hence, it is possible to resume the conversion by applying the MPPT again if during the conversion by applying the lowered DC input voltage value the DC power supplied from the DC power source 20 to the DC input of the inverter 10 goes lower than the predetermined power threshold value.

According to an embodiment, in response to the lowered DC input voltage value being lower than a predetermined voltage threshold value, the DC input voltage of the inverter 10 is controlled to a raised value, which is higher than the voltage value corresponding to the maximum power point of the MPPT. According to an embodiment, the DC input voltage of the inverter 10 is controlled to the raised value such that the DC power supplied from the DC power source 20 to the DC input of the inverter 10 at the most equals the predetermined power threshold value. After controlling the DC input voltage of the inverter to the raised value, DC power supplied from the DC power source 20 to the DC input of the inverter 10 is converted by the inverter into AC power supplied from the AC output of the inverter to the AC network with the DC input voltage control by applying the raised DC input voltage value. Thus, it is possible to limit how low the DC input voltage of the inverter 10 can be controlled. For example, such a predetermined voltage threshold value may correspond to a rectified AC voltage of the AC output of the inverter 10 or generally to a minimum allowable DC input voltage of the inverter 10 possibly with a suitable margin added thereto. And upon meeting the predetermined voltage threshold value, it is possible to limit the DC power supplied from the DC power source 20 by deviating from the maximum power point of the MPPT to a higher voltage value than the one corresponding to the maximum power point of the MPPT. According to an embodiment, in response to detecting, during the converting by applying the raised DC input voltage value, that the DC power supplied from the DC power source 20 to the DC input of the inverter 10 is lower than the predetermined power threshold value, DC power supplied from the DC power source 20 to the DC input of the inverter 10 is started to convert by the inverter 10 into AC power supplied from the AC output of the inverter to the AC network 30 with the DC input voltage control by applying the MPPT. Hence, it is possible to resume the conversion by applying the MPPT again if during the conversion by applying the raised. DC input voltage value the DC power supplied from the DC power source 20 to the DC input of the inverter 10 goes lower than the predetermined power threshold value.

Figure 2:
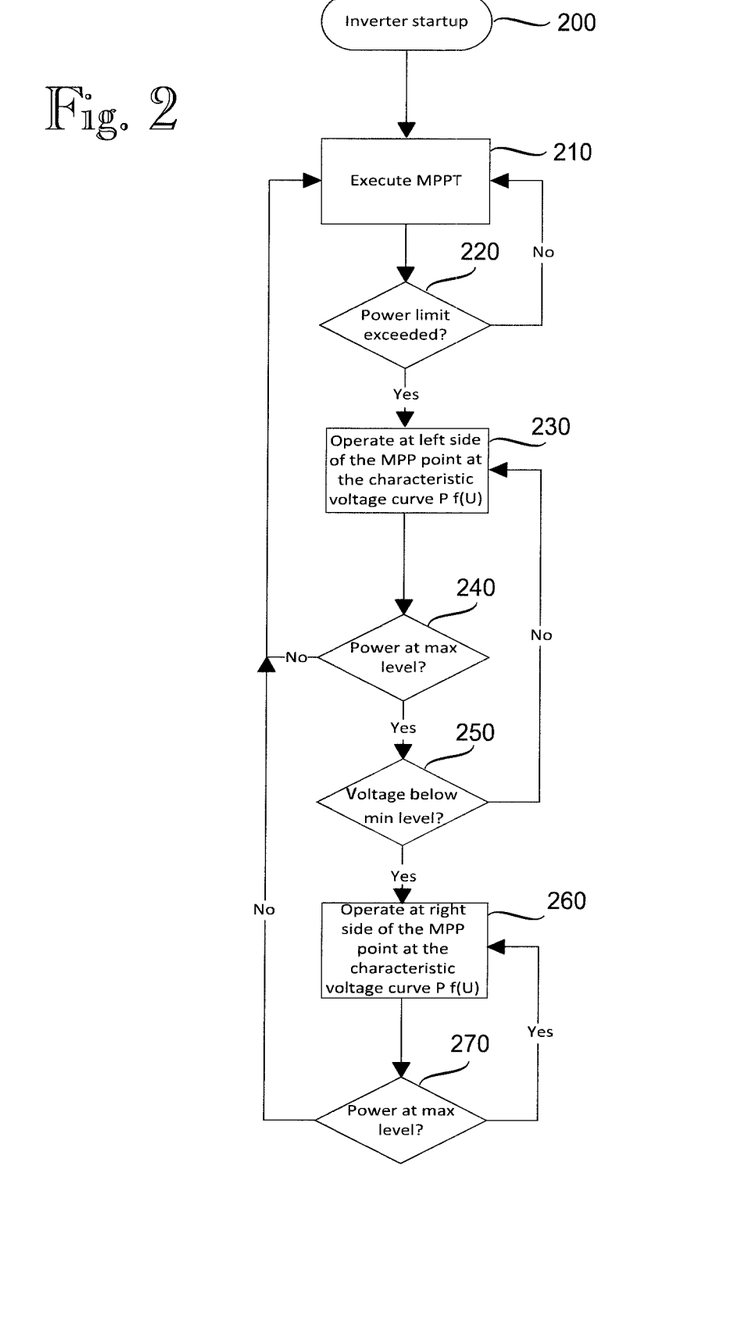
FIG. 2 illustrates a flowchart according to an embodiment.

FIG. 2 illustrates a flowchart according to an exemplary embodiment. First the inverter 10 is started in step 200. After starting, in step 210, the inverter 10 converts DC power supplied from the DC power source 20 to the DC input of the inverter 10 into AC power supplied from the AC output of the inverter to the AC network 30 with the DC input voltage control by applying the maximum power point tracking. In step 220 it is checked, e.g. either continuously or periodically during the conversion 210 by applying the maximum power point tracking, if the DC power supplied from the DC power source 20 to the inverter 10 exceeds the predetermined power threshold value. The DC power supplied from the DC power source 20 to the inverter 10 can be determined on the basis of DC or AC currents and voltages measured by the inverter 10, for example. If the determined DC power supplied from the DC power source 20 to the inverter 10 is equal to or lower than the predetermined power threshold value, then the conversion 210 may continue without any changes. But if the determined DC power supplied from the DC power source 20 to the inverter 10 is higher than the predetermined power threshold value, then the DC input voltage of the inverter is controlled 230 to a lowered value, e.g. such that the DC power supplied from the DC power source to the DC input of the inverter is equal to or lower than the predetermined power threshold value, and the conversion may continue with the lowered DC input voltage value of the inverter 10. In step 240 it is checked, during the conversion 230 by applying the lowered DC input voltage value, if the DC power supplied from the DC power source 20 to the inverter 10 equals the predetermined power threshold value. If the determined DC power supplied from the DC power source 20 to the inverter 10 is lower than the predetermined power threshold value, then the conversion 210 by applying the MPPT may be resumed. If the determined DC power supplied from the DC power source 20 to the inverter 10 still equals the predetermined power threshold value, then in step 250 it may be additionally checked if the DC input voltage value of the inverter 10 is lower than the predetermined voltage threshold value. If the DC input voltage value of the inverter 10 is equal to or higher than the predetermined voltage threshold value, then the conversion 230 with the lowered DC input voltage value may continue. If, however, the DC input voltage value of the inverter 10 is lower than the predetermined voltage threshold value, then in step 260 the DC input voltage of the inverter 10 is controlled to a raised value, e.g. such that the DC power supplied from the DC power source 20 to the DC input of the inverter is equal to or lower than the predetermined power threshold value, and the conversion may continue with the raised DC input voltage value of the inverter 10. In step 270 it is checked, during the conversion 260 by applying the raised DC input voltage value, if the DC power supplied from the DC power source 20 to the inverter 10 equals the predetermined power threshold value. If the determined DC power supplied from the DC power source 20 to the inverter 10 is lower than the predetermined power threshold value, then the conversion 210 by applying the MPPT may be resumed. If the determined DC power supplied from the DC power source 20 to the inverter 10 still equals the predetermined power threshold value, then the conversion 260 with the raised DC input voltage value may continue.

As an exemplary situation, in the morning when the inverter 10 of a photovoltaic power generation system is started, the available power from the PV array 20 may be substantially low. If the PV array 20 peak power is dimensioned higher than the inverter nominal power, later during the day with clear sky conditions the PV array power corresponding to the maximum power point may raise above the nominal power of the inverter, and the controller 100 of the inverter may be forced to leave the maximum power point of the PV array and operate against the power limit of the inverter. Usually when the inverter's power is limited, the DC voltage reference of the inverter is raised. This happens due to the fact that the controller tries to load the PV array less, and thus controls the DC voltage reference value closer to the open circuit voltage of the PV array. As the inverter is feeding full nominal power to the grid 30, and operates on a fairly high DC voltage level, the inverter might need to reduce yet more power because the inverter can be loaded less at higher DC voltage values. Since the PV array is not operated at maximum power point, there exists two operating points at the PV array UI-curve which operating points give the same output power. And since it is more beneficial for the inverter to operate closer to the optimum DC/AC-voltage ratio of about 1.42 (i.e. slightly above the level of the rectified AC voltage), the limiting of PV array should preferably be done by lowering the DC voltage rather than raising it. Because the DC-link voltage cannot be dropped below the rectified AC voltage level (e.g. due to antiparallel diodes of the inverter bridge in case of a single stage inverter with no DC boost), and thus the PV array power cannot be linearly dropped to zero, usually the DC voltage during power limitation is driven to higher direction from the MPPT rather than lower. However, the PV array power will be limited also at the lower operating values as the operating voltage drops below the rectified peak voltage values, as the peak voltage spikes from the AC grid will be fed via the antiparallel diodes to the DC-link and start to limit the power from the PV generator to the grid. Because the limited power is often in the range of about 20% to 30%, sometimes at cold ambient temperature even 50%, of the nominal inverter power, the power limitation towards lower DC voltage levels does not usually cause the DC voltage to drop below the rectified AC voltage level. In the case that the DC voltage drops too close to the rectified voltage level (due to e.g. hot PV panels or too high DC/AC-power ratio dimensioning), the inverter can go over the MPPT power hill and start operating at the higher side of the maximum power point curve. This feature may require that the inverter can either feed for a short time higher power than the nominal to the grid or to stop the power feed for a short time and commence the power feed at the higher operating voltage.

Figure 3:
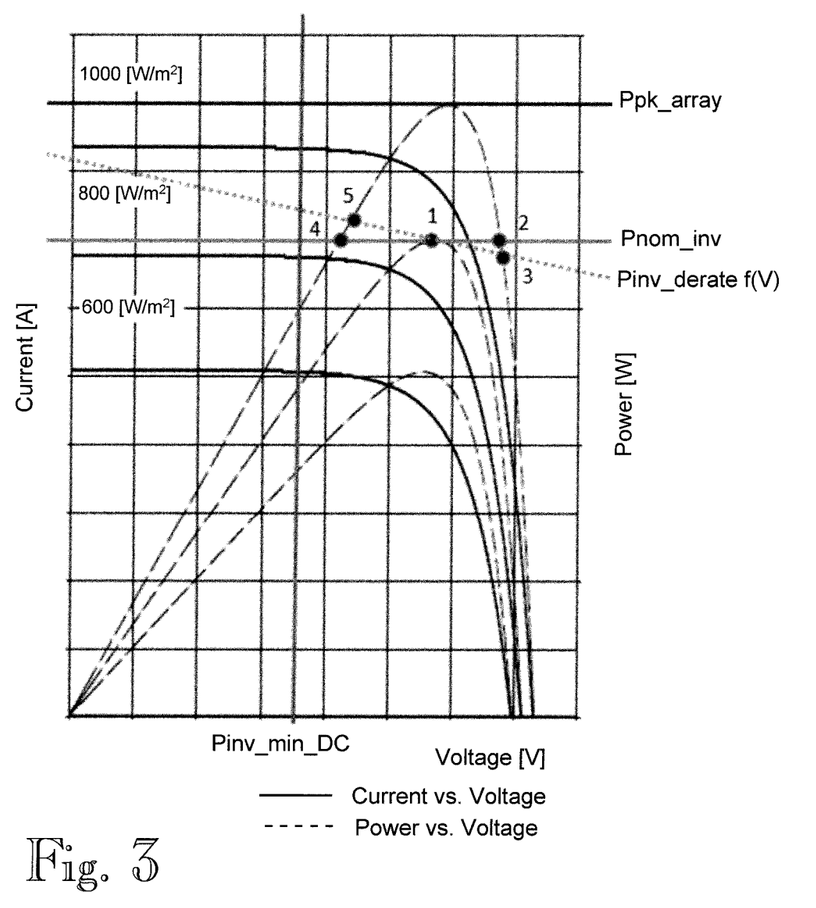
FIG. 3 illustrates characteristic curves of a photovoltaic array.

FIG. 3 illustrates characteristic curves of a photovoltaic array according to an exemplary embodiment. In the example characteristic curves of PV array during different irradiation conditions are shown. Lowest irradiation IU & PU curve pair illustrates the current and power available from a PV array at 600 W/m2 irradiation level. Similar curves are shown for irradiation levels of 800 W/m2 and 1000 W/m2. IU (current vs. voltage, i.e. I f(U)) curves are drawn with solid line and PU (power vs. voltage, i.e. P f(U)) curves are drawn with dashed line, Line Pnom_inv illustrates the nominal power of a PV inverter, line Pinv_derate f(V) illustrates a power derating factor of the PV inverter due to used operating DC voltage level. Thus, in the embodiment of FIG. 3 line Pinv_derate f(V) represents the maximum power of the inverter 10 and hence a predetermined power threshold value, which is a function of the DC input voltage of the inverter 10. The predetermined power threshold value represented by line Pinv_derate f(V) in the embodiment of FIG. 3 consequently varies and is always determined by the prevailing DC input voltage of the inverter 10. Line Pinv_min_DC illustrates the minimum operating level of the PV inverter, corresponding to e.g. the level of the rectified AC voltage Line Ppk_array illustrates the peak power available from the PV array at 1000 W/m2 irradiation level. Due to the DC/AC power ratio of the exemplary system, the PV inverter is able to feed all the power available from the PV array up to 800 W/m2 irradiation level (operation point 1), from there on the PV inverter is not able to work at the maximum power point anymore but needs to limit the available power. At the irradiation level of 1000 W/m2 the inverter would be forced to limit the power by operating either in operation point 2 or 4 according to the nominal power of a PV inverter illustrated by Line Pnom_inv. Since the inverter is operating at a high voltage level at full power, in certain (high) ambient temperature conditions, the PV inverter might need to derate the power even further due to PV inverter voltage derating (Pinv_derate f(V)) and consequently to operate at operation point 3. Such a derating may take place for various reasons. For example, inverter derating may be performed in order to protect components of the inverter from overheating. Also other components of the system, such as the possible capacitance C and/or filter 40 might be stressed by the high voltage requiring the derating of the power. By operating the inverter during such power clipping at operating point 4 (i.e. on the left side of the maximum power point in the respective PU curve), the inverter can due to voltage derating curve actually be operated at operation point 5 according to line Pinv_derate f(V). Operation point 5 corresponds to a substantially higher power level than operation point 3. In other words, the predetermined power threshold value, which in the example according to FIG. 3 is a function of the DC input voltage of the inverter 10 and represented by line Pinv_derate f(V), is higher at operation point 5 than at operation point 3 as can be seen in the figure. Therefore the system could in power clipping mode feed more power to the load (grid).

The control arrangement 100 or other means controlling the inverter according to any one of the embodiments herein, or a combination thereof, may be implemented as one physical unit or as two or more separate physical units that are configured to implement the functionality of the various embodiments. Herein the term 'unit' generally refers to a physical or logical entity, such as a physical device or a part thereof or a software routine. The control arrangement 100 according to any one of the embodiments may be implemented at least partly by means of one or more computers or corresponding digital signal processing (DSP) equipment provided with suitable software, for example. Such a computer or digital signal processing equipment preferably comprises at least a working memory (RAM) providing storage area for arithmetical operations, and a central processing unit (CPU), such as a general-purpose digital signal processor. The CPU may comprise a set of registers, an arithmetic logic unit, and a control unit. The CPU control unit is controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the invention, or a part thereof, may further comprise suitable input means for receiving e.g. measurement and/or control data, and output means for outputting e.g. control or other data. It is also possible to use a specific integrated circuit or circuits, or discrete electric components and devices for implementing the functionality according to any one of the embodiments.

The invention may be implemented in existing electric system components such as inverters. Present inverters may comprise processors and memory that may be utilized in the functions according to the various embodiments described herein. Thus, all modifications and configurations required for implementing an embodiment in existing electric system components, such as inverters may be performed as software routines, which may be implemented as added or updated software routines. If at least part of the functionality of the invention is implemented by software, such software may be provided as a computer program product comprising computer program code which, when run on a computer, causes the computer or corresponding arrangement to perform the functionality according to the embodiments as described herein. Such a computer program code may be stored or generally embodied on a computer readable medium, such as suitable memory, e.g. a flash memory or an optical memory, from which it is loadable to the unit or units executing the program code. In addition, such a computer program code implementing the invention may be loaded to the unit or units executing the computer program code via a suitable data network, for example, and it may replace or update a possibly existing program code.

It is obvious to a person skilled in the art that as technology advances, the basic idea of the invention can be implemented in a variety of ways. Consequently, the invention and its embodiments are not restricted to the above examples, but can vary within the scope of the claims.

The invention claimed is:

1. A method for operating a single-stage inverter having a DC input connected to a DC power source, the method comprising:

converting with the single-stage inverter DC power supplied from the DC power source to the DC input of the single-stage inverter into AC power supplied from an AC output of the single-stage inverter to an AC network with a DC input voltage control by applying a maximum power point tracking, MPPT;

in response to detecting, during the converting by applying the MPPT, that the DC power supplied from the DC power source to the DC input of the single-stage inverter exceeds a predetermined power threshold value, wherein the predetermined power threshold value equals a maximum or nominal power of the inverter, controlling a DC input voltage of the single-stage inverter to a lowered value, which is lower than a voltage value corresponding to a maximum power point of the MPPT; and after controlling the DC input voltage of the single-stage inverter to the lowered value, converting with the single-stage inverter DC power supplied from the DC power source to the DC input of the single-stage inverter into AC power supplied from the AC output of the single-stage inverter to the AC network with the DC input voltage control by applying the lowered DC input voltage value.

2. The method of claim 1, wherein the predetermined power threshold value is a function of the DC input voltage of the single-stage inverter.

3. The method of claim 1, wherein the DC input voltage of the single-stage inverter is controlled to the lowered value, such that the DC power supplied from the DC power source to the DC input of the single-stage inverter at the most equals the predetermined power threshold value.

4. The method of claim 3, wherein
in response to detecting, during the converting by applying the lowered DC input voltage value, that the DC power supplied from the DC power source to the DC input of the single-stage inverter is lower than the predetermined power threshold value, starting to convert with the single-stage inverter DC power supplied from the DC power source to the DC input of the single-stage inverter into AC power supplied from the AC output of the single-stage inverter to the AC network with the DC input voltage control by applying the MPPT.

5. The method of claim 1, wherein
in response to the lowered DC input voltage value being lower than a predetermined voltage threshold value, controlling the DC input voltage of the single-stage inverter to a raised value, which is higher than the voltage value corresponding to the maximum power point of the MPPT, such that the DC power supplied from the DC power source to the DC input of the single-stage inverter at the most equals the predetermined power threshold value; and
after controlling the DC input voltage of the single-stage inverter to the raised value, converting with the single-stage inverter DC power supplied from the DC power source to the DC input of the single-stage inverter into AC power supplied from the AC output of the single-stage inverter to the AC network with the DC input voltage control by applying the raised DC input voltage value.

6. The method of claim 5, wherein
in response to detecting, during the converting by applying the raised DC input voltage value, that the DC power supplied from the DC power source to the DC input of the single-stage inverter is lower than the predetermined power threshold value, starting to convert with the single-stage inverter DC power supplied from the DC power source to the DC input of the single-stage inverter into AC power supplied from the AC output of the single-stage inverter to the AC network with the DC input voltage control by applying the MPPT.

7. A computer readable medium comprising:
a set of instructions structured to be executed by a processor effective to:
convert with a single-stage inverter DC power supplied from a DC power source to a DC input of the single-stage inverter into AC power supplied from an AC output of the single-stage inverter to an AC network with a DC input voltage control by applying a maximum power point tracking, MPPT;

in response to detecting, during the converting by applying the MPPT, that the DC power supplied from the DC power source to the DC input of the single-stage inverter exceeds a predetermined power threshold value, wherein the predetermined power threshold value equals a maximum or nominal power of the inverter, control a DC input voltage of the single-stage inverter to a lowered value, which is lower than a voltage value corresponding to a maximum power point of the MPPT; and
after controlling the DC input voltage of the single-stage inverter to the lowered value, convert with the single-stage inverter DC power supplied from the DC power source to the DC input of the single-stage inverter into AC power supplied from the AC output of the single-stage inverter to the AC network with the DC input voltage control by applying the lowered DC input voltage value.

8. An inverter arrangement comprising:
a single-stage inverter with a DC input and an AC output; and
control arrangement configured to:
control the single-stage inverter to convert DC power supplied from a DC power source to the DC input of the single-stage inverter into AC power supplied from the AC output of the single-stage inverter to an AC network with a DC input voltage control by applying a maximum power point tracking, MPPT;
in response to detecting, during the converting by applying the MPPT, that the DC power supplied from the DC power source to the DC input of the single-stage inverter exceeds a predetermined power threshold value, wherein the predetermined power threshold value equals a maximum or nominal power of the inverter, control a DC input voltage of the single-stage inverter to a lowered value, which is lower than a voltage value corresponding to a maximum power point of the MPPT; and
after controlling the DC input voltage of the single-stage inverter to the lowered value, control the single-stage inverter to convert DC power supplied from the DC power source to the DC input of the single-stage inverter into AC power supplied from the AC output of the single-stage inverter to the AC network with the DC input voltage control by applying the lowered DC input voltage value.

9. The inverter arrangement of claim 8, wherein the predetermined power threshold value is a function of the DC input voltage of the single-stage inverter.

10. The inverter arrangement of claim 8, wherein the control arrangement is configured to control the DC input voltage of the single-stage inverter to the lowered value, such that the DC power supplied from the DC power source to the DC input of the single-stage inverter at the most equals the predetermined power threshold value.

11. The inverter arrangement of claim 10, wherein the control arrangement is configured to:
in response to detecting, during the converting by applying the lowered DC input voltage value, that the DC power supplied from the DC power source to the DC input of the single-stage inverter is lower than the predetermined power threshold value, control the single-stage inverter to start to convert DC power supplied from the DC power source to the DC input of the single-stage inverter into AC power supplied from the AC output of the single-stage inverter to the AC network with the DC input voltage control by applying the MPPT.

12. The inverter arrangement of claim 8, wherein the control arrangement is configured to:
in response to the lowered DC input voltage value being lower than a predetermined voltage threshold value, control the DC input voltage of the single-stage inverter to a raised value, which is higher than the voltage value corresponding to the maximum power point of the MPPT, such that the DC power supplied from the DC power source to the DC input of the single-stage inverter at the most equals the predetermined power threshold value; and
after controlling the DC input voltage of the single-stage inverter to the raised value, control the single-stage inverter to convert DC power supplied from the DC power source to the DC input of the single-stage inverter into AC power supplied from the AC output of the single-stage inverter to the AC network with the DC input voltage control by applying the raised DC input voltage value.

13. The inverter arrangement of claim 12, wherein the control arrangement is configured to:
in response to detecting, during the converting by applying the raised DC input voltage value, that the DC power supplied from the DC power source to the DC input of the single-stage inverter is lower than the predetermined power threshold value, control the single-stage inverter to start to convert DC power supplied from the DC power source to the DC input of the single-stage inverter into AC power supplied from the AC output of the single-stage inverter to the AC network with the DC input voltage control by applying the MPPT.

14. An electric system comprising:
an inverter arrangement comprising:
a single-stage inverter with a DC input and an AC output; and
control arrangement configured to:
control the single-stage inverter to convert DC power supplied from a DC power source to the DC input of the single-stage inverter into AC power supplied from the AC output of the single-stage inverter to an AC network with a DC input voltage control by applying a maximum power point tracking, MPPT;
in response to detecting, during the converting by applying the MPPT, that the DC power supplied from the DC power source to the DC input of the single-stage inverter exceeds a predetermined power threshold value, wherein the predetermined power threshold value equals a maximum or nominal power of the inverter, control a DC input voltage of the single-stage inverter to a lowered value, which is lower than a voltage value corresponding to a maximum power point of the MPPT; and
after controlling the DC input voltage of the single-stage inverter to the lowered value, control the single-stage inverter to convert DC power supplied from the DC power source to the DC input of the single-stage inverter into AC power supplied from the AC output of the single-stage inverter to the AC network with the DC input voltage control by applying the lowered DC input voltage value; and
a photovoltaic DC power source connected to the DC input of the single-stage inverter, the DC power source comprising one or more photovoltaic panels.

15. A single-stage inverter, configured to:
convert DC power supplied to a DC input of the single-stage inverter into AC power supplied from an AC output of the single-stage inverter with a DC input voltage control by applying a maximum power point tracking, MPPT;
in response to detecting, during the converting by applying the MPPT, that the DC power supplied to the DC input of the single-stage inverter exceeds a predetermined power threshold value determined as a function of a DC input voltage of the single-stage inverter, wherein the predetermined power threshold value equals a maximum or nominal power of the inverter, lower the DC input voltage of the single-stage inverter to a lowered value, which is lower than a voltage value corresponding to a maximum power point of the MPPT; and
after controlling the DC input voltage of the single-stage inverter to the lowered value, convert DC power supplied to the DC input of the single-stage inverter into AC power supplied from the AC output of the single-stage inverter with the DC input voltage control by applying the lowered DC input voltage value.

16. The single-stage inverter of claim 15, wherein the single-stage inverter is configured to lower the DC input voltage of the single-stage inverter to said lowered value such that the DC power supplied from the DC power source to the DC input of the single-stage inverter at the most equals the predetermined power threshold value determined as the function of the DC input voltage of the single-stage inverter.

17. The method of claim 2, wherein the DC input voltage of the single-stage inverter is controlled to the lowered value, such that the DC power supplied from the DC power source to the DC input of the single-stage inverter at the most equals the predetermined power threshold value.

18. The method of claim 17, wherein
in response to detecting, during the converting by applying the lowered DC input voltage value, that the DC power supplied from the DC power source to the DC input of the single-stage inverter is lower than the predetermined power threshold value, starting to convert with the single-stage inverter DC power supplied from the DC power source to the DC input of the single-stage inverter into AC power supplied from the AC output of the single-stage inverter to the AC network with the DC input voltage control by applying the MPPT.

19. The method of claim 2, wherein
in response to the lowered DC input voltage value being lower than a predetermined voltage threshold value, controlling the DC input voltage of the single-stage inverter to a raised value, which is higher than the voltage value corresponding to the maximum power point of the MPPT, such that the DC power supplied from the DC power source to the DC input of the single-stage inverter at the most equals the predetermined power threshold value; and
after controlling the DC input voltage of the single-stage inverter to the raised value, converting with the single-stage inverter DC power supplied from the DC power source to the DC input of the single-stage inverter into AC power supplied from the AC output of the single-stage inverter to the AC network with the DC input voltage control by applying the raised DC input voltage value.

20. The method of claim 19, wherein
in response to detecting, during the converting by applying the raised DC input voltage value, that the DC power supplied from the DC power source to the DC input of the single-stage inverter is lower than the predetermined power threshold value, starting to convert with the single-stage inverter DC power supplied from the DC power source to the DC input of the single-stage inverter into AC power supplied from the AC output of the single-stage inverter to the AC network with the DC input voltage control by applying the MPPT.

* * * * *